(No Model.)
F. W. GORDON.
BRICK MASONRY.
No. 385,804. Patented July 10, 1888.
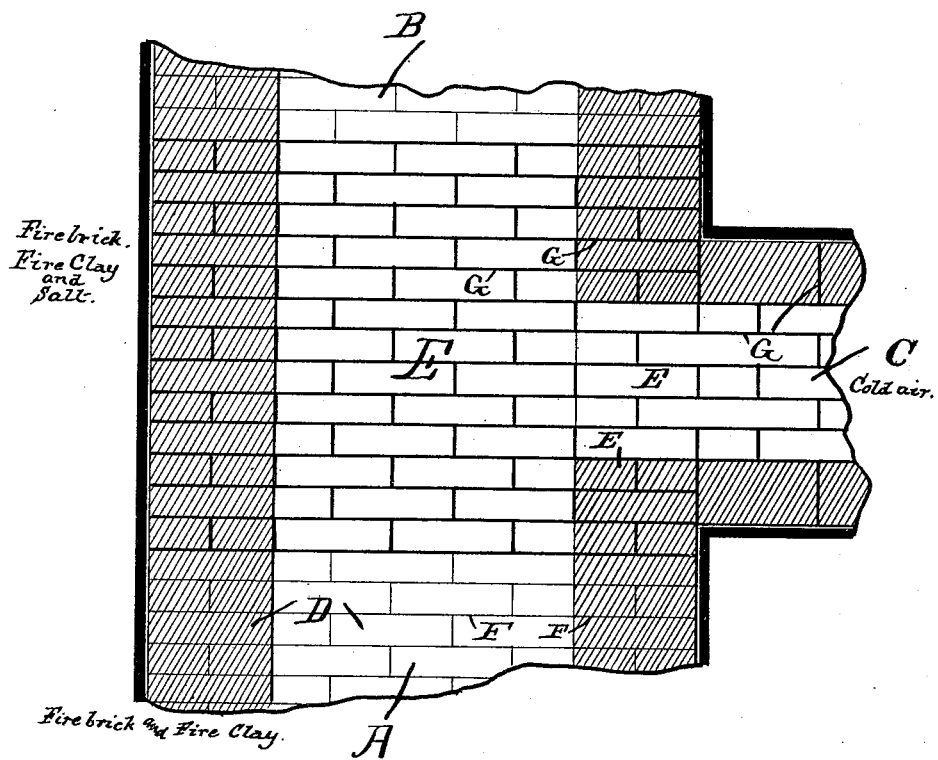
Witnesses:
Carl Spengel
W. A. Seward.
Fred W. Gordon,
Inventor,
by James N. See,
Attorney.

UNITED STATES PATENT OFFICE.

FRED. W. GORDON, OF PHILADELPHIA, PENNSYLVANIA, ASSIGNOR TO GORDON, STROBEL & LAUREAU, (LIMITED,) OF SAME PLACE.

BRICK MASONRY.

SPECIFICATION forming part of Letters Patent No. 385,804, dated July 10, 1888.

Application filed February 27, 1888. Serial No. 265,466. (No model.)

*To all whom it may concern:*

Be it known that I, FRED. W. GORDON, of Philadelphia, Philadelphia county, Pennsylvania, have invented certain new and useful Improvements in Brick Masonry, of which the following is a specification.

This invention pertains to brick masonry exposed alternately to the action of high heat and cutting blasts of cold air.

The improvement will be readily understood from the following description, taken in connection with the accompanying drawing, which is a vertical section of a vertical conduit intersected by a horizontal conduit or branch.

In the drawing, A indicates the lower portion of a conduit, assumed as being exposed at intervals to the action of high heat and heat sufficiently high to destroy ordinary brickwork, but not sufficiently high to destroy firebrick, sufficiently high to destroy ordinary mortar and sufficiently high to cause the proper setting and hardening of fire-clay, it being understood that these conditions apply to the lower portion, A, of the conduit; B, the upper portion of this conduit, so far above the portion A as to represent conditions under which the heat is sufficient to destroy common brick and not to destroy fire-brick, and not sufficiently high to cause the proper hardening and setting of fire-clay, the effect being merely to dry the clay; C, a side conduit or branch leading into the conduit A B, and assumed as being intended for the passage into the conduit A B of cold air under considerable pressure and under high velocity; D, the brick-work of which the conduit portion A is built, such brick-work consisting of fire-brick, which will resist the intense heat, laid up in fire-clay, which will properly harden under the intense heat and resist destruction by such heat; E, the brick-work of the conduit portions above the conduit portion A, such brick-work being formed of fire-brick capable, of course, of resisting the heat, which is much lower than the heat to which the brick-work D is subjected, this brick-work being laid up in a mortar composed of fire-clay and salt; F, the fire-clay and mortar joints in the brick-work D, and G the compound mortar joints of the brick-work E.

The mortar for the brick-work E is formed of salt and fire-clay in the proportion of about one to three. The high heat will harden the fire clay-mortar joints of the brick-work D, and the comparatively low heat will harden the compound mortar joints of the brick-work E. Heated matters, intensely hot at A and comparatively cool above, may thus safely be passed through the conduit A B and caused to serve in properly setting the mortar joints of the conduit, and at alternate intervals a cutting blast of cold air may be injected into the conduit through the branch conduit C without danger of this blast cutting away the mortar joints of the brick-work E to the destruction of that brick-work.

I claim as my invention—

In brick masonry, the combination, in a conduit subjected alternately to the action of heated matter and a cutting blast of cold air, of brick masonry formed of fire-brick laid up in fire-clay, and brick masonry formed of firebrick laid up in a compound mortar of salt and fire-clay, substantially as and for the purpose set forth.

FRED. W. GORDON.

Witnesses:
F. B. LAND,
P. F. WETHINGTON.